Patented Oct. 6, 1925.

1,556,489

UNITED STATES PATENT OFFICE.

DOMENICO CARBONE, OF MILAN, ITALY.

PROCESS FOR PREPARING CULTURES OF BACILLUS FELSINEUS.

No Drawing. Application filed October 23, 1922. Serial No. 596,518.

*To all whom it may concern:*

Be it known that I, DOMENICO CARBONE, residing at 14 Via A. Lecchi, Milan, in the Kingdom of Italy, have invented a new and useful Process for Preparing Cultures of Bacillus Felsineus, of which the following is a specification.

The process herewith described deals with the preparation of cultures of the bacillus felsineus for use in the maceration of hemp and like vegetable substances.

According to this process, the bacillus felsineus is cultivated according to the usual methods of bacteriological science, in vessels containing the following means of culture: hemp cut into pieces, placed in water and sterilized by steam or in an autoclave, bringing same into contact with the saccharomyces ellipsoideus, cultivated separately in a proper way for the growth of the blastomiceti (for example malt decoctions).

With one of such cultures, after development, another can be infected always bringing it into contact with saccharomyces, and in this way it can be continued indefinitely.

Upon stirring up the liquid containing said cultures when well developed, in order to keep the sediment in suspension, it can be poured into the tanks for the maceration of vegetable substances with the bacillus felsineus, according to the methods already known.

Having now described my invention and how the same is to be carried out, what I claim as my invention is:

A process for preparing bacillus felsineus cultures by using recipients containing hemp cut into pieces, placed in water and sterilized, bringing same into contact with the saccharomyces ellipsoideus, cultivated separately, for example, in a malt decoction.

In testimony whereof I affix my signature.

DOMENICO CARBONE.